United States Patent
Patterson, Jr. et al.

(10) Patent No.: US 10,651,484 B2
(45) Date of Patent: May 12, 2020

(54) EXTRUDED CARBON FUEL CELL COMPONENTS

(71) Applicant: Audi AG, Ingolstadt (DE)

(72) Inventors: Timothy W. Patterson, Jr., West Hartford, CT (US); Thomas H. Madden, Glastonbury, CT (US); Robert M. Darling, South Windsor, CT (US); Glenn M. Allen, Vernon, CT (US)

(73) Assignee: AUDI AG, Ingolstadt (DE)

( * ) Notice: Subject to any disclaimer, the term of this patent is extended or adjusted under 35 U.S.C. 154(b) by 330 days.

(21) Appl. No.: 14/435,676

(22) PCT Filed: Oct. 19, 2012

(86) PCT No.: PCT/US2012/061194
§ 371 (c)(1),
(2) Date: Apr. 14, 2015

(87) PCT Pub. No.: WO2014/062198
PCT Pub. Date: Apr. 24, 2014

(65) Prior Publication Data
US 2015/0288005 A1    Oct. 8, 2015

(51) Int. Cl.
*H01M 8/026* (2016.01)
*H01M 8/04029* (2016.01)
(Continued)

(52) U.S. Cl.
CPC ....... *H01M 8/04029* (2013.01); *H01M 8/026* (2013.01); *H01M 8/0213* (2013.01);
(Continued)

(58) Field of Classification Search
None
See application file for complete search history.

(56) References Cited

U.S. PATENT DOCUMENTS 3,188,242 A * 6/1965 Kordesch et al. ...... H01M 4/96
429/458
4,853,301 A   8/1989 Granata, Jr. et al.
(Continued)

FOREIGN PATENT DOCUMENTS

CN    1524066 A    8/2004
CN    2911972 Y    6/2007
(Continued)

OTHER PUBLICATIONS

Berger H. (2009) Dies, Pressure Heads, Strainer Plates and More. In: Händle F. (eds) Extrusion in Ceramics. Engineering Materials and Processes. Springer, Berlin, Heidelberg (Year: 2009).*

*Primary Examiner* — Lucas J. O'Donnell
(74) *Attorney, Agent, or Firm* — Seed Intellectual Property Law Group LLP

(57) ABSTRACT

Fuel cell reactant flow field plates (22, 32) are formed by extruding long sections (17, 25) of carbonaceous material, either with straight grooves (18, 28) formed by the extrusion die, or by end milling or arbor milling, and then cut to a proper size, including cuts in which the edges of the plates are at an angle with respect to the grooves. Cooler plates are formed of water-permeable material (39) in which hydrophobic material (40) is impregnated so as to define coolant channels (42-44) with inlets and outlets (47, 49). A two-layer cooler plate is formed by stamping voids in one layer (51) that define coolant flow channels (52) with inlets (54) and outlets (56) while a second layer (59) is stamped with voids (61, 62) that define coolant inlet and exit headers; juxtaposition of the layers, with or without bonding, form the cooler plate. A cooler plate (65) is made by corrugating thin metal sheet, providing coolant channels (68) for cathodes and coolant channels (73) for anodes when interposed therebetween.

20 Claims, 5 Drawing Sheets

(51) Int. Cl.
*H01M 8/0213* (2016.01)
*H01M 8/0228* (2016.01)
*H01M 8/0254* (2016.01)
*H01M 8/0221* (2016.01)
*H01M 8/24* (2016.01)
*H01M 8/1004* (2016.01)
*H01M 8/1018* (2016.01)

(52) U.S. Cl.
CPC ....... *H01M 8/0221* (2013.01); *H01M 8/0228* (2013.01); *H01M 8/0254* (2013.01); *H01M 8/1004* (2013.01); *H01M 8/1018* (2013.01); *H01M 8/24* (2013.01); *H01M 2008/1095* (2013.01); *H01M 2250/20* (2013.01); *H01M 2300/0082* (2013.01); *Y02T 90/32* (2013.01)

(56) References Cited

U.S. PATENT DOCUMENTS

| | | | |
|---|---|---|---|
| 5,236,687 A * | 8/1993 | Fukuda | B29C 70/14 423/447.2 |
| 5,470,671 A * | 11/1995 | Fletcher | H01M 8/02 429/434 |
| 5,804,326 A | 9/1998 | Chow et al. | |
| 5,853,909 A | 12/1998 | Reiser | |
| 6,024,848 A * | 2/2000 | Dufner | C25B 9/08 204/252 |
| 6,617,068 B2 | 9/2003 | Dufner et al. | |
| 6,818,165 B2 | 11/2004 | Gallagher | |
| 8,110,316 B2 | 2/2012 | Oda et al. | |
| 9,391,332 B2 | 7/2016 | Jung et al. | |
| 2002/0071978 A1* | 6/2002 | Bekkedahl | H01M 8/0243 429/446 |
| 2002/0127464 A1 | 9/2002 | Terazawa et al. | |
| 2002/0180094 A1* | 12/2002 | Gough | B29C 59/04 264/127 |
| 2003/0068541 A1* | 4/2003 | Sugiura | H01M 8/0267 429/434 |
| 2003/0091885 A1* | 5/2003 | Kobayashi | H01M 8/0273 29/623.2 |
| 2004/0018412 A1 | 1/2004 | Orsbon et al. | |
| 2004/0043285 A1* | 3/2004 | Nagoshi | H01M 4/8605 429/465 |
| 2004/0131533 A1* | 7/2004 | Spacie | C04B 35/52 423/448 |
| 2005/0164070 A1 | 7/2005 | Krajewski et al. | |
| 2006/0068265 A1 | 3/2006 | Hanlon et al. | |
| 2007/0111078 A1 | 5/2007 | Tanno | |
| 2007/0190392 A1* | 8/2007 | Kim | H01M 8/021 429/457 |
| 2008/0220154 A1 | 9/2008 | Gallagher | |
| 2012/0034549 A1* | 2/2012 | Kim | H01M 10/0525 429/482 |
| 2012/0288784 A1* | 11/2012 | Victor | H01M 8/0213 429/512 |
| 2013/0171547 A1 | 7/2013 | Tanno | |
| 2013/0260274 A1 | 10/2013 | Carnevale et al. | |
| 2014/0338825 A1* | 11/2014 | Breault | B29C 47/54 156/244.18 |
| 2015/0288005 A1 | 10/2015 | Patterson et al. | |

FOREIGN PATENT DOCUMENTS

| | | |
|---|---|---|
| CN | 101312250 A | 11/2008 |
| CN | 101325260 B | 10/2010 |
| CN | 101872867 A | 10/2010 |
| CN | 102208659 A | 10/2011 |
| DE | 10 2005 002174 A1 | 7/2006 |
| DE | 10 2009 051 434 A1 | 5/2011 |
| EP | 1 099 266 A2 | 5/2001 |
| EP | 1 699 100 A1 | 9/2006 |
| JP | 58-145067 A | 8/1983 |
| JP | 2-108249 A | 4/1990 |
| JP | 4-267062 A | 9/1992 |
| JP | H06-231793 A | 8/1994 |
| JP | H07-240221 A | 9/1995 |
| JP | H11111307 A | 4/1999 |
| JP | 2000-149963 A | 5/2000 |
| JP | 2002-298902 A | 10/2002 |
| JP | 2003-176327 A | 6/2003 |
| JP | 2005-327611 A | 11/2005 |
| JP | 2008-47293 A | 2/2008 |
| JP | 2011-146247 A | 7/2011 |
| JP | 2012-59380 A | 3/2012 |
| JP | 2012-142286 A | 7/2012 |
| JP | 2014-504439 A | 2/2014 |
| JP | 2015-532520 A | 11/2015 |
| WO | 2012/032922 A1 | 3/2012 |
| WO | 2012/087265 A1 | 6/2012 |

\* cited by examiner

EXTRUDED CARBON FUEL CELL COMPONENTS

TECHNICAL FIELD

Fuel cell reactant and coolant flow field plates are extruded with straight flow channel grooves, or have straight grooves provided by gang or arbor milling, made in layers with rotary dies, stamped, or by impregnated flow channel definition.

BACKGROUND ART

Proton exchange membrane (PEM) fuel cells have advantageously been provided with porous, hydrophilic reactant gas flow field plates, typically with either the fuel or oxidant reactant gas plate having coolant flow field channels provided as grooves extending inward from the surface opposite to the surface having reactant gas flow field grooves formed therein. These have been referred to as water transport plates. In many instances, the grooves forming flow fields have been shaped to provide various operational objectives. Provision of shaped grooves, with sufficient dimensional tolerance, has required end milling, or similar processes which are time-consuming and expensive. Provision of coolant grooves on opposite sides of flow field plates from reactant grooves also require the use of end mills for precise depth and positioning.

Usage of porous, hydrophilic reactant and coolant flow plates have proven to be particularly advantageous in fuel cells providing energy to drive electric vehicles. However, the utilization in commonly available vehicles is subject to extreme cost restraints in comparison with other fuel cell applications.

A large percentage of the cost of fuel cells currently powering electric vehicles is the cost of producing the reactant and/or coolant flow field plates.

SUMMARY

Reactant and/or coolant flow field plates are provided with processes which eliminate the need for end milling or other expensive manufacturing steps. One particular cost reducing provision herein is utilizing either flow field plates having only straight grooves extruded therein for flow channels, grooving flat plates with gang or arbor milling to accomplish flow channels, impregnating water-pervious flow field plates with hydrophobic coolant channel demarcations, or stamping of components with rotary dies to provide coolant-flowing voids or corrugations.

In one embodiment, fuel flow plates are made by extruding flat porous, hydrophilic carbonaceous sheets, either a) with the flow field channels provided by the extrusion die or b) extruded flat, followed by gang or arbor milling of channels. Long sheets are extruded and/or milled and then cut into proper size for use in a designated fuel cell.

In another embodiment, oxidant flow fields are similarly extruded with channels provided in the extrusion die, or as long flat sheets followed by gang or arbor milling of straight flow fields. Thereafter, the extruded and/or milled sheets with straight flow fields are trimmed at an angle to provide successive elements having edges which are at a nominal angle with respect to flow channels of each piece, to accommodate coolant flow channels.

In another embodiment, a cooler plate is made by rotary die, cutting two layers: one providing voids forming straight coolant flow channels, and the other providing voids forming inlet and exit header channels, the two layers being superposed when in place for use. In an alternative to this embodiment, the two layers may be bonded together before utilization in a fuel cell stack.

In another embodiment, a cooler plate is made by stamping a metal sheet in a corrugated fashion so as to provide coolant channels which are open to both reactant flow surfaces, when inserted therebetween.

In another embodiment, a coolant flow field plate is made by impregnating a carbonaceous porous, hydrophilic substrate with hydrophobic material, such as a polymer, so as to delineate channels in the substrate, thereby directing the flow of water or other coolant as desired.

Other variations will become more apparent in the light of the following detailed description of exemplary embodiments, as illustrated in the accompanying drawings.

MODE(S) OF IMPLEMENTATION

Figure 1:
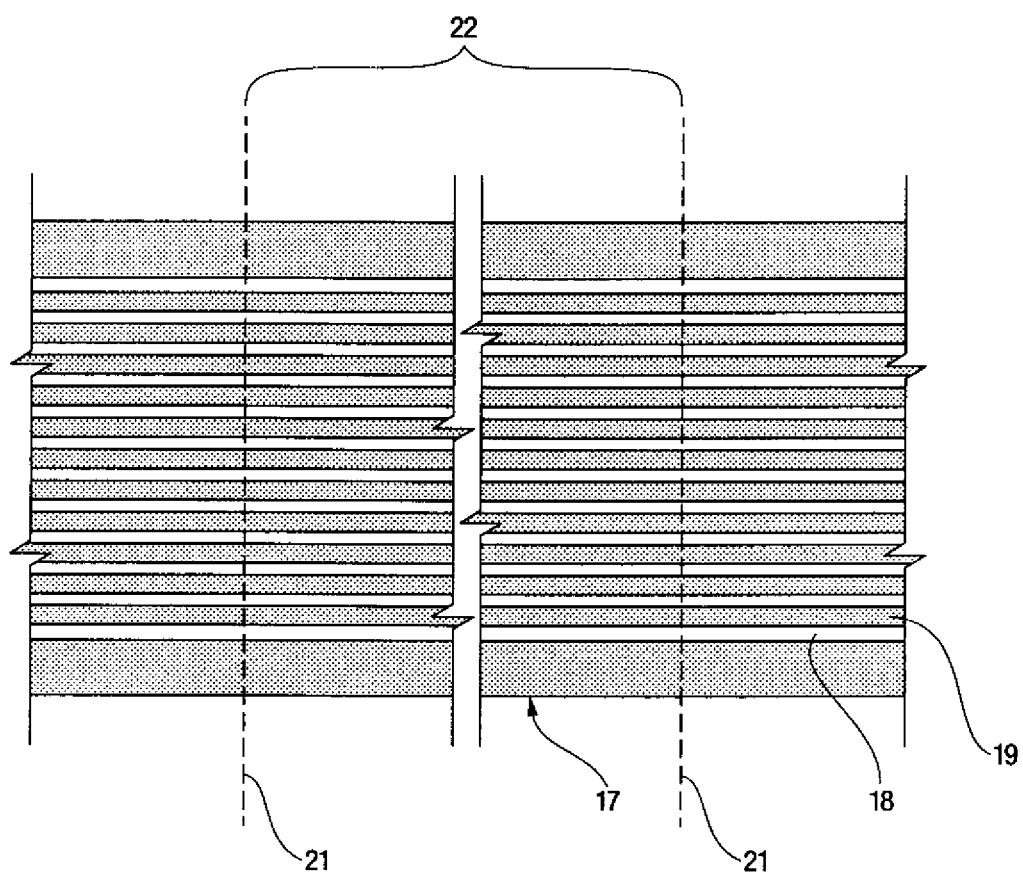
FIG. 1 is a simplified plan view of an elongated strip of extruded porous, hydrophilic carbonaceous substrate material, with straight fuel flow channels formed therein either by the extrusion die or gang milled or arbor milled after being extruded in a flat form.

Referring now to FIG. 1, an elongated sheet of porous hydrophilic carbonaceous material 17 includes straight grooves 18 separated by ridges 19 which are either formed therein by the extrusion die during an extrusion process, or formed therein by gang milling or arbor milling after the sheet 17 has been extruded in a plain, flat shape. Having the grooves straight permits forming them during extrusion, and also permits forming the grooves using high speed, low cost gang milling or arbor milling. The sheet 17 is thereafter cut, orthogonally with respect to the grooves 28, along the dashed lines 21 utilizing any suitable process such as rotary slicing or end milling to form a plurality of single fuel flow field plates 22.

Figure 2:
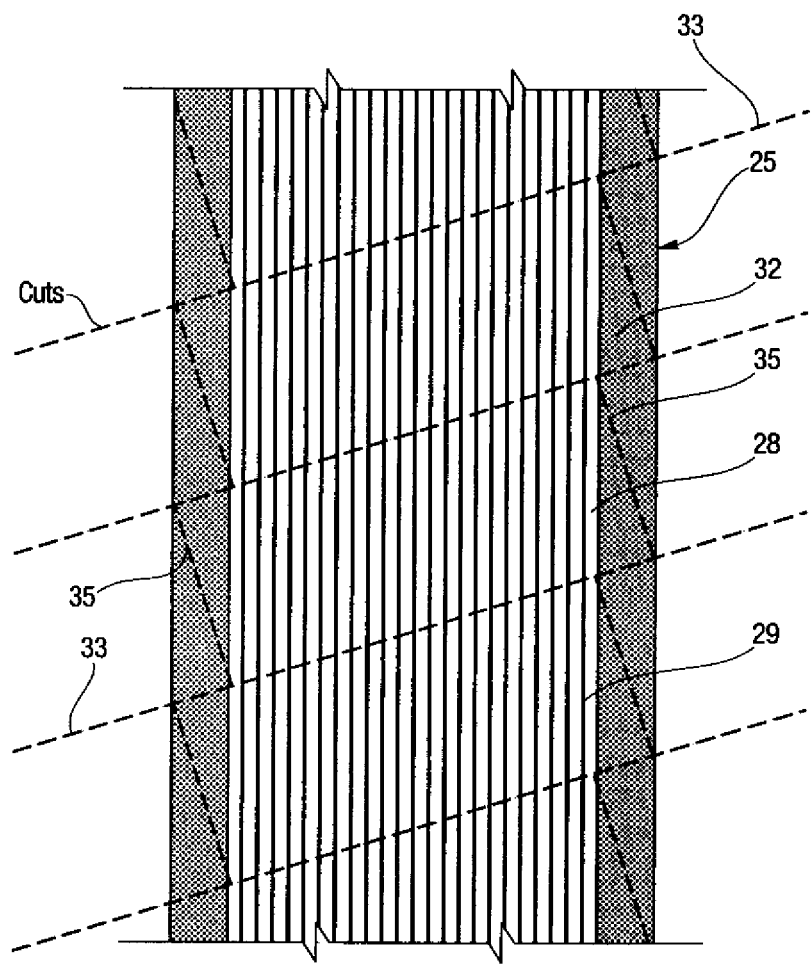
FIG. 2 is a simplified plan view of an elongated sheet of porous, hydrophilic carbonaceous substrate material suitable for use as a plurality of oxidant reactant gas flow field plates, illustrating the manner of cutting same, the sheet being extruded with straight grooves forming reactant flow channels, or having straight grooves gang milled or arbor milled after being extruded flat.

In FIG. 2, an elongated, porous, hydrophilic carbonaceous sheet 25 has a plurality of straight grooves 28 separated by ridges 29 formed therein either during the extrusion process, or after the sheet is extruded in a flat form, by arbor milling or gang milling. Thereafter, the sheet 25 may be cut, at an angle with respect to the grooves 28, into a plurality of individual oxidant flow field plates 32 as indicated by dashed lines 33. Even though the grooves 28 may need to be at an angle compared to the edges 35 of each oxidant flow field plate 32, this is easily accommodated by first forming the elongated sheet 25 with straight grooves, either by gang or arbor milling or by extrusion, and thereafter, cutting the flow fields at an angle with respect to the grooves.

Cooler plates may be formed by extrusion with or without additional milling as described with respect to FIGS. 1 and 2 hereinbefore if found desirable in any particular implementation of a fuel cell stack.

Figure 3:
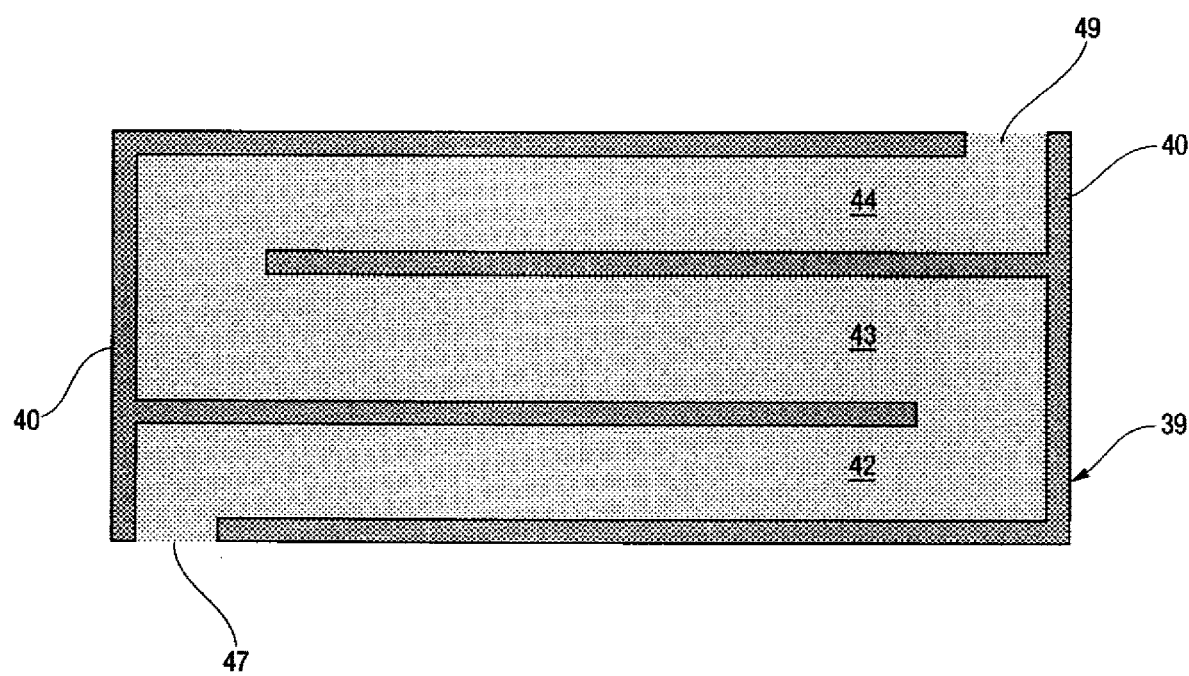
FIG. 3 is a plan view of a porous, hydrophilic coolant plate wherein the coolant flow paths are formed by hydrophobic barriers, such as a polymer, impregnated therein.

FIG. 3 illustrates a cooler plate 39, wherein the areas 40 are impregnated with hydrophobic material, such as PTFE or other polymer. The hydrophobicity of the impregnated areas channel the coolant into passageways 42-44 from an inlet 47 to an exit 49. The hydrophobic coolant channel demarcations may be easily formed by first applying a suitable mask, which may be a mask representing a large number of cooler plates, after which a suitable polymer can be overlaid or sprayed on the masked material and then heated to above the melting point of the polymer, under pressure if necessary in any case, and then cooled to the solidification temperature of the polymer while still under pressure, in accordance with known techniques.

Figure 4:
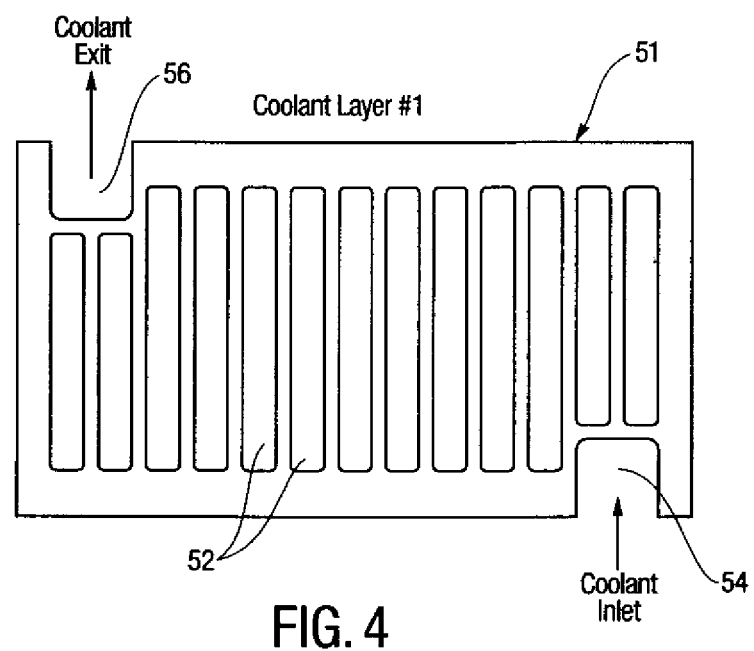
FIG. 4 is a plan view of one layer of a cooler plate formed of a solid sheet by punching out voids in which coolant is to flow.
Figure 5:
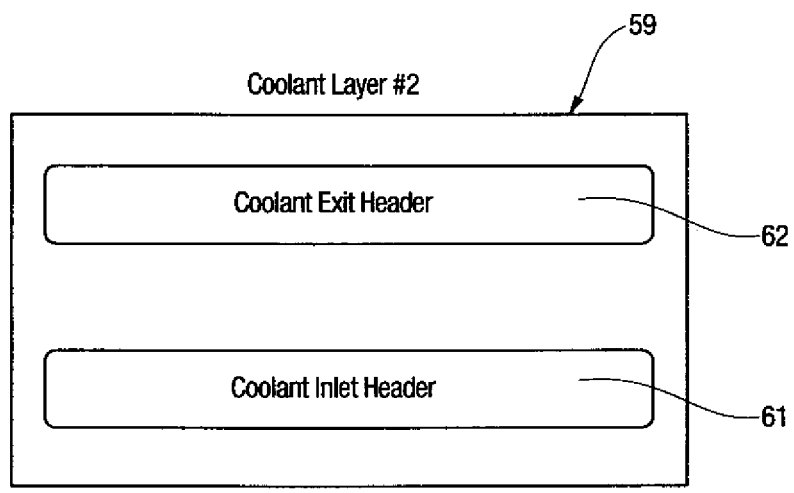
FIG. 5 is a plan view of a second layer of the cooler plate of FIG. 4 with voids forming the inlet and exit headers stamped out of a solid sheet.

Another form of cooler plate is illustrated in FIGS. 4 and 5. In FIG. 4, a first coolant flow channel layer 51 has coolant channel voids 52 stamped therethrough. The layer 51 may be thin stainless steel, nickel, or other suitable metal, or a water impervious carbonaceous sheet typical of those used in fuel cells. The stamping also provides a coolant inlet void 54 and a coolant exit void 56. A second layer 59 of the cooler plate is provided by stamping voids to create a coolant inlet header 61 and a coolant exit header 62. When the layer 59 of FIG. 5 is juxtaposed over the layer 51 of FIG. 4, a cooler plate is formed. The two layers may be adhered together, such as by any form of bonding, or may simply be juxtapositioned in the assembly of a fuel cell stack.

Figure 6:
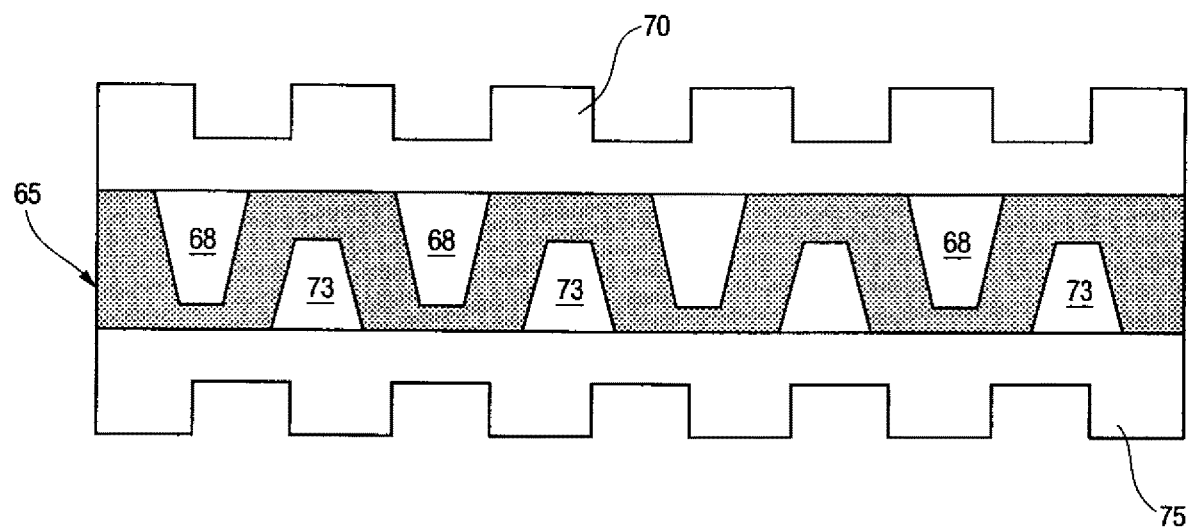
FIG. 6 is a simplified cross sectional view of a stamped, corrugated cooler plate providing coolant channels to both the fuel flow field plate and the oxidant flow field plate.

Another simple form of cooler plate 65 is illustrated in FIG. 6. The plate 65 is stamped into a corrugated shape that provides coolant flow passageways 68 adjacent a porous, hydrophilic cathode flow field plate 70, and coolant passageways 73 adjacent a porous, hydrophilic anode flow field plate 75. The ends of the corrugations may be crimped or they may be filled with suitable seal material of the type heretofore used in fuel cells.

The various reactant flow field plates and cooler plates may be used in selected combinations to be effective in any given implementation of a fuel cell stack therewith. The fuel reactant flow field plates may each be disposed on one side of a related one of a plurality of membrane electrode assemblies (MEAs), the oxidant reactant flow field plates may each be disposed on a second side of the MEAs, and the cooler plates may be disposed between oxidant and fuel flow field plates, to form a fuel cell stack.

Since changes and variations of the disclosed embodiments may be made without departing from the concept's intent, it is not intended to limit the disclosure other than as required by the appended claims.

The invention claimed is:

1. A method, comprising:
extruding carbonaceous elongated sheets of material;
forming straight grooves into a central portion of each of the elongated sheets of material and forming a respective planar portion without grooves extending along each side of the central portion, including forming the central portion having the straight grooves and each planar portion without grooves during the extruding;
forming fuel reactant gas flow field plates by cutting a first group of the elongated sheets of material orthogonally with respect to the grooves;
forming a plurality of oxidant reactant gas flow field plates by cutting a second group of the elongated sheets of material non-orthogonally with respect to the grooves on each side of the plurality of oxidant reactant gas flow field plates;
forming fuel cell cooler plates of porous thin sheet material having opposing planar surfaces extending between a perimeter edge of each plate, the forming including impregnating at least one planar surface of each cooler plate with a hydrophobic material to delineate channels of hydrophobic material within each plate, the channels of each plate being connected between an inlet and an exit, wherein during operation hydrophobic sidewalls of each channel convey coolant along a tortuous path from the inlet to the exit internally through each cooler plate; and
forming a fuel cell stack by disposing each of a plurality of membrane electrode assemblies adjacent first sides of one of the fuel reactant gas flow field plates and one of the oxidant reactant gas flow field plates, with one of the cooler plates adjacent a second side of the reactant gas flow field plates and a second side of the oxidant reactant flow field plates.

2. The method of claim 1 wherein forming straight grooves into the central portion and forming the respective planar portions without grooves in the extruded, elongated sheet during the extruding includes forming the straight grooves and the respective planar portions with an extrusion die.

3. The method according to claim 2, wherein each sheet of elongated carbonaceous material of the elongated sheets of material is porous and hydrophilic.

4. The method according to claim 1, wherein forming the plurality of oxidant reactant gas flow field plates by cutting the second group of elongated sheets of material non-orthogonally with respect to the straight grooves includes cutting the second group of elongated sheets of material at an angle that is not equal to 0 degrees and not equal to 90 degrees with respect to the straight grooves on each side of the plurality of oxidant reactant gas flow field plates such that the respective planar portions of each of the plurality of oxidant reactant gas flow field plates have a triangular shape.

5. The method according to claim 4, wherein the cutting includes the angle being greater than 0 degrees and less than 90 degrees relative to horizontal.

6. The method according to claim 2, further comprising:
each of the sheets of elongated carbonaceous material being impervious to water.

7. A method, comprising:
extruding a carbonaceous elongated sheet of material having straight grooves that extend from a first end to a second end of the sheet of material, the extruding including forming the straight grooves during the extruding with an extrusion die;
forming a plurality of gas flow field plates by cutting the elongated sheet of material at an angle with respect to the grooves on each side of each of the plurality of gas flow field plates that is not equal to 0 degrees and not equal to 90 degrees;
forming a fuel cell cooler plate from a sheet of material which is permeable to liquid water, the forming including:
impregnating at least one planar surface of the cooler plate with a hydrophobic material to delineate channels of hydrophobic material within the plate, the at least one planar surface of the cooler plate extending between an outermost edge of the cooler plate, the channels of the plate being connected between an inlet and an exit, wherein during operation hydrophobic sidewalls of each channel that are coextensive with the at least one planar surface convey coolant along a tortuous path from the inlet to the exit internally through the cooler plate, wherein the impregnating includes impregnating only certain portions of the at least one surface to delineate the channels, wherein a location of the sidewalls of the channels corresponds to a location of the certain portions and only the sidewalls of the channels comprise hydrophobic material; and forming a fuel cell stack by disposing a membrane electrode assembly with a first side of the gas flow field plate adjacent the membrane electrode assembly and a second side of the gas flow field plate adjacent the fuel cell cooler plate.

8. The method according to claim 7, further comprising: the hydrophobic material comprises polytetrafluoroethylene.

9. A method, comprising:

forming a plurality of reactant flow field plates, the forming including extruding a sheet of material with straight grooves in an active area of at least one side of the sheet of the material and extruding a planar non-active area without grooves extending along the active area, the extruding including forming the straight grooves and the planar non-active area during the extruding with an extrusion die;

cutting a group of the plurality of reactant flow field plates non-orthogonally with respect to the straight grooves;

providing cooler plates of thin sheet material;

impregnating at least one planar surface of each cooler plate with a hydrophobic material to delineate channels of hydrophobic material within each plate, the at least one planar surface extending between a perimeter edge of each cooler plate, the channels of each plate being connected between an inlet and an exit, wherein during operation hydrophobic sidewalls of each channel convey coolant at least from the inlet in a first direction along a first channel, through a first opening to a second channel, along the second channel in a second direction opposite the first direction, through a second opening to a third channel, and along the third channel in the first direction to the exit, sidewalls of at least one of the first, second, and third channels being coextensive with the at least one planar surface; and forming a fuel cell stack by disposing each cooler plate between respective reactant flow field plates of a plurality of adjacent fuel cells confining the flow of coolant.

10. A device, comprising:

a fuel cell stack that includes:

fuel reactant gas flow field plates that include a carbonaceous sheet of material with straight grooves in the sheet of material with ends that are orthogonal with respect to the grooves;

a plurality of oxidant reactant gas flow field plates that include a carbonaceous sheet of material with straight grooves with ends that are non-orthogonally with respect to the grooves, each of the plurality of oxidant reactant gas flow field plates including an active area including the straight grooves and a non-active area extending along the active area without grooves; and fuel cell cooler plates of thin sheet material having opposing planar surfaces extending between opposing plate edges, each plate impregnated in at least one planar surface with a hydrophobic material to delineate channels of hydrophobic material within each plate, the channels of each plate being fluidly connected between an inlet and an exit, wherein during operation hydrophobic sidewalls of each channel convey coolant along a tortuous path from the inlet to the exit internally through each cooler plate.

11. The device of claim 10 wherein the fuel cell stack includes each of a plurality of membrane electrode assemblies between first sides of one of the fuel reactant gas flow field plates and one of the oxidant reactant gas flow field plates, with one of the cooler plates between second sides of the reactant gas flow field plates.

12. The method of claim 1 wherein the impregnating includes impregnating only certain portions of the at least one surface to delineate the channels, wherein a location of the sidewalls of the channels corresponds to a location of the certain portions and only the sidewalls of the channels comprise hydrophobic material.

13. The method of claim 12 wherein a base surface between hydrophobic sidewalls of each channel is porous and hydrophilic.

14. The method of claim 12 wherein the impregnating includes applying a mask with demarcations through the mask corresponding to the certain portions of the at least one surface and applying a polymer over the mask, the polymer attaching to the at least one surface of each cooler plate at the demarcations.

15. The method of claim 1 wherein during operation hydrophobic sidewalls of each channel convey coolant along the tortuous path includes the hydrophobic sidewalls of each channel conveying coolant from the inlet in a first direction along a first channel, through a first opening to a second channel, along the second channel in a second direction opposite the first direction, through a second opening to a third channel, and along the third channel in the first direction to the exit.

16. The method of claim 9 wherein the impregnating further comprises forming the channels by applying a mask having demarcations corresponding to a location of the channels and applying a polymer over the mask, the polymer impregnating the at least one surface via the demarcations.

17. The method of claim 9 wherein the impregnating includes impregnating only certain portions of the at least one surface to delineate the channels, wherein a location of the sidewalls of the channels corresponds to a location of the certain portions and only the sidewalls of the channels comprise hydrophobic material.

18. The method of claim 9 wherein the impregnating includes the hydrophobic sidewalls conveying coolant internally through the channels from the inlet to the exit.

19. A fuel cell stack, comprising:

a plurality of reactant gas flow field plates that include a carbonaceous sheet of material with straight grooves with a first pair of opposing ends that are at a first angle with respect to the grooves, that is not equal to 0 degrees and not equal to 90 degrees and a second pair of opposing ends that are at a second angle with respect to the grooves that is not equal to 0 degrees and not equal to 90 degrees; and a sheet of porous material having opposing planar surfaces extending between opposing sheet edges, at least one planar surface of the sheet impregnated with a hydrophobic material to delineate channels of hydrophobic material within each plate with sidewalls that are coextensive with the at least one planar surface, the channels of each plate being fluidly connected between an inlet and an exit, wherein during operation hydrophobic sidewalls of each channel convey coolant along a tortuous path from the inlet to the exit internally through each cooler plate.

20. The fuel cell stack of claim 19 wherein the sheet of porous material is disposed between reactant gas flow field plates of adjacent fuel cells within the fuel cell stack.

\* \* \* \* \*